United States Patent [19]

Salia

[11] Patent Number: 4,749,272
[45] Date of Patent: Jun. 7, 1988

[54] WATER-PROOF OPTICAL GRID FOR CORRECTING OPTICAL DEFECTS

[76] Inventor: Miguel Salia, Radiólogos 79X, Col. El Sifon, Deleg. Iztapalapa, 09400 Mexico, D.F., Mexico

[21] Appl. No.: 861,087

[22] Filed: May 8, 1986

[51] Int. Cl.[4] .......................... G02C 1/00; G02C 7/16; G02C 11/08
[52] U.S. Cl. ....................................... 351/46; 351/43; 351/62
[58] Field of Search .................. 2/433, 428, 429, 430; 351/45, 46, 165

[56] References Cited

U.S. PATENT DOCUMENTS 4,452,516  6/1984  Salia ...................................... 351/45

FOREIGN PATENT DOCUMENTS 304872  4/1955  Switzerland .......................... 351/46

Primary Examiner—Rodney B. Bovernick
Attorney, Agent, or Firm—Darby & Darby

[57] ABSTRACT

A water-proof optical grid for correcting optical defects comprises an intermediate grid formed by two perpendicularly arranged series of dark and opaque bars integrally connected to each other in order to form an integral network, all of said bars having a triangular cross section with the base of the triangle facing the eyes of the wearer and the vertex away therefrom, whereby to form square openings having their smaller areas facing the eyes and their larger areas away from the eyes, the ratio of said smaller areas to said larger areas being of from 1:36 to 1:2.25, preferably 1:4, said smaller area of each square opening being of from 0.04 to 4 mm$^2$, preferably 1 mm$^2$, and said bars being 1 mm wide, said grid being sandwiched between a pair of transparent plates contiguous thereto in order to avoid the entrance of water into said square opening of the grid when the thus formed laminate or sandwich is submerged in water.

6 Claims, 1 Drawing Sheet

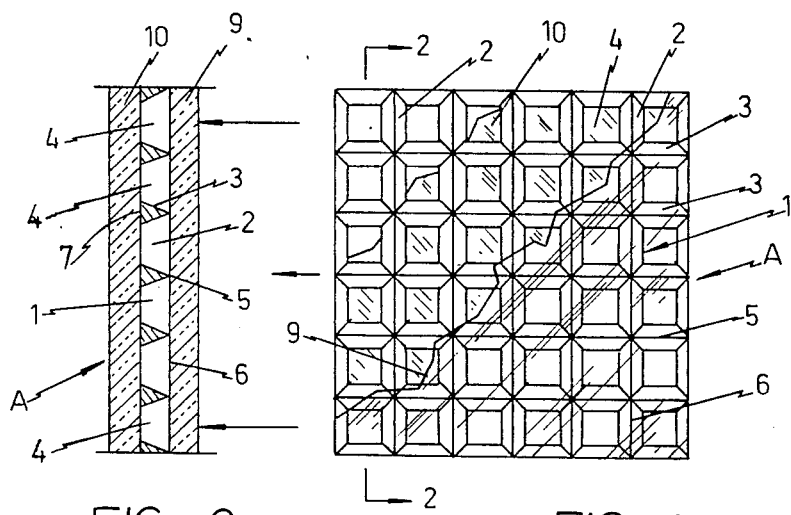
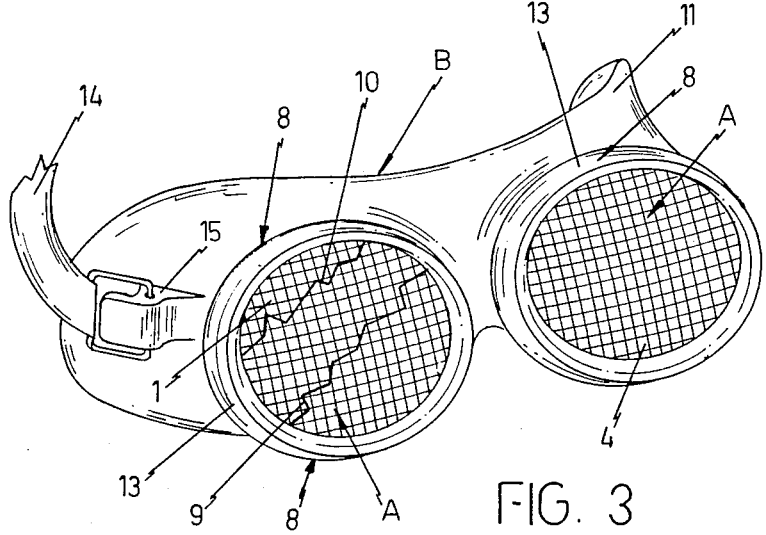
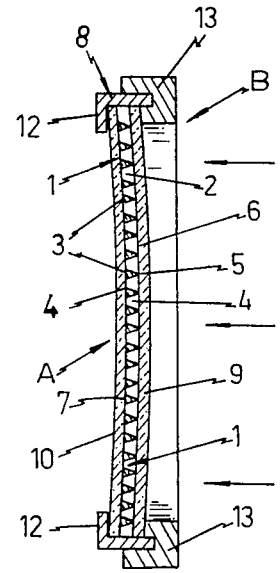

WATER-PROOF OPTICAL GRID FOR CORRECTING OPTICAL DEFECTS

FIELD OF THE INVENTION

The present invention refers to an improved water-proof optical grid useful for correcting optical aberrations, with increased image perception capacity and, more particularly, it is related to a water-proof optical grid capable of being used in goggles or the like in order to increase the image perception capacity of the wearer without appreciably affecting said capacity under the water.

BACKGROUND OF THE INVENTION

In the optical arts various systems for correcting optical aberrations shown by the human eye are very well known. However, such systems generally comprise the superposition, to the defective eyes, of an artificial lens or of a series of artificial lenses suitably designed and calculated to the effect that, by means of the joint and complementary action of said lenses with the defective eye, the defects presented by the latter be corrected.

Thus, according to the traditional optical arts, spherical aberrations are corrected by means of the addition of various elements that jointly refract the light such that the same will be directed in the adequate directions in order to avoid sphericity of the images projected or observed through the eyes.

Other type of aberrations, known as astigmatism, farsightedness or presbyopsia, myopic astigmatism and the like, also constituting common diseases of the human eye, are corrected in accordance with the prior art, by means of lenses suitably designed to compensate the deficient refraction of the light rays produced by defects either in the cornea or in the crystalline of the eye.

However, the above mentioned technique of adding correcting lenses is highly costly and requires very accurate calculations, whereby the correcting lenses normally result of a high price.

One other method of partially correcting optical aberrations are the non-refracting devices such as the so called stenopeic spectacles which have been known as a visual aid from early times. For instance, in the text book System of Ophthalmology, by Sir Steward Duke-Elder and David Abrams, edited by Sir Stewart Duke-Elder, Volume V, pages 794 et seq, it is very clearly mentioned that said stenopeic spectacles were advocated and their optical principles explained by Daza de Valdes in 1623, and were first employed clinically by the French Ophthalmologists Serre in 1857 and Frans Donders in 1864. However, as also clearly stated in said text book, the main disadvantage of a stenopeic hole is that it provides a very small visual field and, since it does not move with the eye, is of little advantage to the wearer when walking about. It is also mentioned in said text book that when it is required for general purposes a disc composed of several such openings bored in a sheet of opaque material may prove "better than nothing", which means that said stenopeic spectacles have proven to be highly inefficient articles and, as is also well known and mentioned and described in many optics books, a stenopeic hole has as its sole purpose to avoid the entrance into the defective eye of the diffraction circles that generally accompany pure light rays, whereby said stenopeic holes must be obviously of circular shape, and as Duke-Elder et al very clearly mention in their text book, in order to be effective, the multiplicity of stenopeic holes provided in spectacles, must be spaced in about 4 mm. between each other, and must have a size of about 1.5 mm. for distant vision and 0.3 mm. for near vision.

The fact that the stenopeic holes have as their only purpose to prevent the entrance of the diffraction circles, whereby their form must be obviously circular, and the fact that the spacement thereof must be relatively large in stenopeic spectacles, render said stenopeic spectacles highly impractical devices for general use, inasmuch as the effort of the wearer is not compensated by the benefit produced by the improvement of the image perception, and thus said stenopeic spectacles have not gained any acceptance among the general public, regardless of the fact that many persons may be in real need of something more than mere spectacles or mere contact lenses to improve their vision. The problems encountered with the decrease in the perception of light intensity and vision angle with the stenopeic holes, is of considerable importance and has been determinant of the lack of acceptance for these devices among the public.

The stenopeic spectacles were improved by Guthrie, who provided a surface covered by stenopeic holes of the size and with the spacement mentioned above, with an additional centrally arranged so called stenopeic slit, in order to increase vision at least when reading, but the stenopeic slit may be regarded as highly inefficient for many particular purposes, and more particularly when the defects in the eye to which the said stenopeic slit is superposed, include aberrations of the spherical type and more particularly astigmatism.

In Mexican Patent No. 132,553 patented Feb. 10, 1976 to the same applicant hereof, an optical grid is described for causing interference of light rays and which to a great extent remedied the defects of the devices of the above described techniques, including the stenopeic spectacles.

Said grids were designed for application to spectacles and comprised an undetermined number of square openings, said grids being either flat or concave to be adapted to the rings of ophthalmic frames for spectacles with conventional glasses and/or in substitution thereof.

Even when the optical grid of Mexican Patent No. 132,553 is very efficient to correct optical aberrations particularly caused by the excess of luminosity, by means of a process of light interference effected through the plurality of square holes that it contains, the said grid does not provide any usefulness in the correction of optical aberrations of other types and, of course, the said optical grid is mainly based in the decrease of the light intensity by means of said interference, thus causing obscurity or lower intensity of the light detected, with a better perception of the images. However, the considerable decrease of luminosity produced by the grids of Mexican Patent No. 132,553 is in itself an inconvenience, in view of the fact that particularly in dark places or in the twilight time of the day, as well as in the darkness of the night, the use of said grids causes a loss of visual intensity which is not compensated by the improvement of the image perception, and this may cause the loss of perception of many dark objects.

The principle of providing square holes uniformly spaced from each other, however, as described in said Mexican Patent No. 132,553, for the first time changes the concept of using stenopeic holes for trying to improve visual perception, and may be regarded as a considerable improvement in the art of correcting optical aberrations of lenses. However, this grid was very primitive and may be regarded as a first effort of applicant to provide a practical device that could be used in substitution of glasses for spectacles, without the loss of light intensity and however with a high improvement in the image perception and an absolute correction of optical aberrations as will be described in the instant application.

U.S. Pat. No. 4,452,516, patented June 5, 1984, to the same applicant hereof, describes for the first time what might be regarded as the definite solution to the problem of correcting optical aberrations suffered by the eyes of the human beings without the need of using refractive lenses or the like. This patent describes an optical grid that may be used for the manufacture of spectacles, and which comprises two series of bars of triangular cross section, arranged parallel to each other and with each series perpendicularly arranged with respect to the other series in order to form a grid leaving square free spaces therein, the apexes of said bars being directed toward the outer face of the grid, on which the light falls and the bases of said bars being directed towards the inner face of the grid which is directly confronted to the eyes which defects are desired to correct, said square free spaces constituting openings of a square frustopyramidal shape, the larger base of which is at the inner face of the grid, the area of said larger base of the openings being in a ratio of from about 36:1 to 2.25:1 with respect to the area of the smaller base, the total area of the smaller base of each one of said square openings being of from about 0.04 to about 4 mm$^2$, and the width of said bars being of about 1 mm.

Although the optical grids and spectacles of U.S. Pat. No. 4,452,516 may be regarded as absolutely efficient to correct optical defects of the human eye, the spectacles of said patent were restricted to be used only in lieu of or in addition to prescription lenses, but did not permit the sportsmen to make use thereof particularly for swimming or diving or the like, because the effect of the water within which said spectacles were submerged, is to fill the square openings of the grid, thus completely impairing the vision of the wearers when leaving the water pool.

BRIEF SUMMARY OF THE INVENTION

Having in mind the defects of the prior art correcting devices for optical aberrations, it is an object of the present invention to provide a water-proof optical grid which will be of a very simple and economical construction and yet capable of correcting optical aberrations in the human eye, at the same time considerably increasing the image perception and the image clarity when said grid is submerged in water.

One other object of the present invention is to provide a water-proof optical grid of the above mentioned character, which will not cause considerable decrease in luminosity and will permit the perception of objects even in relatively dark places, with the profiles highly improved and clear.

A more particular object of the present invention is to provide a water-proof optical grid of the above mentioned character, which by very simple means will be capable of correcting optical aberrations without appreciable loss of luminosity and a higher precision of the perceived objects.

One other object of the present invention is to provide water-proof goggles containing an optical grid of the above mentioned nature, which by very simple means will be capable of avoiding distorsions of the perceived image when the wearer leaves the water pool.

BRIEF DESCRIPTION OF THE DRAWINGS

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawings, in which:

FIG. 1 is a fragmentary front elevational view of a water-proof optical grid built in accordance with the present invention;

FIG. 2 is a cross sectional elevational view of the water-proof optical grid, taken along lines 2—2 of FIG. 1 and looking in the direction of the arrows;

FIG. 3 is a perspective view of a pair of water-proof goggles which use the water-proof grid of the present invention; and FIG. 4 is a fragmentary cross sectional elevational view of the structure of the grid and support of the goggles illustrated in FIG. 3, in order to show the construction thereof.

DETAILED DESCRIPTION

Having now more particular reference to the drawings and more specifically to FIGS. 1 and 2 thereof, there is shown a water-proof optical grid for correcting optical aberrations, built in accordance with the present invention and illustrated by means of the general reference character A, said water-proof grid A comprising a laminate constituted by an optical grid 1 proper, which in turn comprises a plurality of bars 2 having a triangular cross section, and arranged parallely to each other, and a plurality of bars 3 also of triangular cross section and also parallely arranged to each other, but in a perpendicular relationship with respect to bars 2, such that the two series of bars 2 and 3 form a grid 2 leaving square shaped openings 4, in order to permit the passage of light; said grid 1 being sandwiched between a pair of transparent sheets 9 and 10, made of glass, acrylic resins or any other transparent material, and firmly adhered to both faces of grid 1 to provide a water-proof assembly.

The bases 7 of bars 2 and 3 are arranged towards the inner side of the grid, that is, on the face which will be directly confronted with the eyes the aberrations of which are to be corrected, whereas apexes 5 and 6 of bars 2 and 3 are directed towards the outer face of the grid, that is, the face where the light falls as shown by means of the arrows in FIG. 2.

Therefore, the openings 4 through which the light passes through the grid are square shaped openings constituted by the smaller bases of the spans left between bars 2 and 3, said openings being of frustopyramidal square shape, with their larger bases towards the outer face and their smaller bases towards the inner face of the grid.

In order to accomplish a suitable removal of the undesirable light waves by interference, and so as to suitably correct the aberrations of the eyes to which the optical grid of the present invention is associated, together with the supply of an improved image perception, it has been found that the smaller area of openings 4 must be related to the larger area of said openings by a ratio of from 1:36 to 1:2.25, preferably of 1:4, inasmuch as it has been experimentally determined that said range of area relationship is the one producing the optimal results, particularly in connection with the best clarity and definition of perception of the observed objects, accompanied by an absolute correction of spherical, astigmatic and chromatic aberrations, provided that the total area of each opening 4 at its smaller base, be of between approximately 0.2 mm. and 2 mm. on each side, that is, of from 0.04 to 4 mm$^2$, and that the width of said bars be of about 1 mm.

While the accurate nature of the physical interpretation of the phenomenon occuring in the optical grid in accordance with the present invention is not fully understood, it is a true experimentally determined fact that the provision of the frustopyramidal openings with their smaller bases directed towards the inner face of the grid and their larger bases directed towards the outer face of the grid, and with said openings dimensioned such that the smaller areas thereof, as compared to the larger areas will be in a relationship of from 1:36 to 1:2.25; with the smaller areas of approximately from 0.04 to 4 mm$^2$, and with a width of the bars of 1 mm, the correction of optical aberrations that it was not possible to correct with the prior art devices, is surprisingly accomplished. On the other hand, the lower the ratio of the smaller to the larger area, the better the clarity of the image perceived.

FIGS. 3 and 4 of the drawings show a particular application of the water-proof optical grid A built in accordance with the present invention, by the arrangement of said grids A, either with a flat or a concave constitution, in the rings 8 of water-proof ophthalmic frame B, in order to constitute spectacles or goggles for correcting visual defects such as low chromatic perception, astigmatism, farsightedness and other ocular diseases derived from sphericity of the cornea and focusing defects of the crystalline, and which will permit use thereof under the water.

Having now more particular reference to FIG. 3 of the drawings, it may be seen that a pair of water-proof optical grids built in accordance with FIGS. 1 and 2 as described above, may be cut in a circular manner so as to be utilized in conjunction with goggles of the type used for swimming or diving activities, whereby said pair of approximately circular grids A are inserted within a support 8 contained in an optical frame which constitutes a pair of water-proof goggles B as clearly shown in FIG. 3 of the drawings. The fixation of the pair of grids A within the supports 8 of the structure of the goggles B, is carried out by means of any type of mounting, and particularly by means of a mounting such as that shown in FIG. 4 of the drawings that shall be described in more detail hereinbelow.

The goggles B are constituted by a body 11 of plastic flexible material which contains a pair of ears 15 from which a band 14 extends, so as to permit the fastening around the head of the user, as is well known in the art. Said body 11 of plastic and flexible material of the goggles B, is provided with a pair of openings to accomodate the mountings 8 as shown, each one of said mountings, as more clearly shown in FIG. 4 of the drawings, comprising an inner projection 12 which extends from the body 11 outwardly thereof, and forming a cylindrical housing within which the sandwiched structure or water-proof optical grid A is inserted, until the same abuts with the bottom of the cylindrical housing 12, to provide a water-proof mounting. The mounting is completed by means of a ring 13, which may be inserted either by pressure fitting or by screw threads into the outwardly directed flange of the cylindrical housing 12, as very clearly shown in FIG. 4 of the drawings, to press against the outer lamina 9 of the grid, and to force the inner lamina 10 of the grid to press against the flange of the cylindrical housing 12, so as to constitute a full water-proof hermetical closure with the body 11 of the goggles B.

As is also clearly shown in FIG. 4 of the drawings, the mounting of each water-proof optical grid A is carried out such that the inner transparent lamina 10 receives the smaller ends of the frustopyramidal holes 2 of the grid 1, that is, the bases of the triangular bars 2 and 3, and the apexes of said bars 5 abut against the outer transparent lamina 9, whereby to provide the appropriate direction in connection with the light beams that fall into the goggles as shown by the arrows in FIG. 4, to pass through the laminate A, namely, through the transparent sheet 9, the frustopyramidal openings 4 of the grid 1 and the transparent sheet 10, into the eyes of the wearer.

The above described structure may be used in a very efficient manner for practicing any water sport activities, such as swimming, diving, etc., and permits correction of optical defects of the wearer because the action of the optical grid 1 is not impeded by the entrance of water within the spaces formed by the openings 4 of the grid 1, particularly when the wearer leaves the water pool, inasmuch as otherwise, that is, should the laminae 9 and 10 not be provided, then the water would completely fill up the cavities of the grid 1, absolutely impeding the vision of the wearer who should have to take off the goggles to be able to see in the air, in view of the interference made by said layers of water within the openings of the grid 1. With the sandwiched arrangement shown in FIGS. 3 and 4, the above problem is completely eliminated inasmuch as the smooth lamina 9 will permit the water to slide down and will not permit the same to enter within the openings of the grid 1, whereby the vision may be recovered almost instantly when leaving the water pool. Within the water pool, the hermeticity of the device shown in FIGS. 3 and 4, will permit the wearer the make use of the advantages of the optical grid 1 to improve his vision, because in the particular instance of a wearer submerged in a water pool, it will be clearly understood that the outer transparent lamina 9 will hold the external pressure of the water and the mounting 8 will not permit said water to pass to the other side of the water-proof optical grid of the present invention, which is the main object of the instant device.

The device of the present invention, therefore, is perfectly suitable to improve the vision of the wearer both within and out of the water, without any problem.

From the above it will be clearly seen that for the first time an optical aid has been provided for correcting optical defects of the human eye both when the grid is used in a normal manner and when it is used within a water pool or the like, said optical grid being absolutely water-proof and capable of being used for insertion into goggles that permit its use within water such as by persons who wish to swim, dive, etc. without loosing precision in their field of vision.

What is considered to be the most important accomplishment of the instant invention is that for the first time, this optical aid may be efficiently used in combination with water-proof goggles, which do not decrease the field of vision of the wearer and which however, correct most of the visual defects of the said wearer, both within or outside the water, without producing considerable undesirable defects other than the fact that the wearer must become used to having a grid in front of his eyes, which in accordance with tests effected with voluntary individuals, only takes a few hours.

Although I have shown and described certain specific embodiments of my invention, I am fully aware that many modifications thereof are possible. My invention, therefore, is not to be restricted except insofar as is necessitated by the prior art and by the spirit of the appended claims.

What is claimed is:

1. A water-proof optical grid having an increased capacity of image perception and adapted for correcting optical aberrations, comprising a first optical grid comprising a plurality of first bars having a triangular cross-section and arranged parallely to each other, a plurality of second bars having a triangular cross-section and parallely arranged to each other, said second bars situated in a perpendicular relationship with respect said first bars, such that the two series said first and second bars form a second grid defining a plurality of square-shaped openings to permit passage of light, said first grid being sandwiched between a pair of transparent sheets made of a transparent material, and firmly adhered to both faces of said first grid, the bases of said bars being directed towards the inner face of the grid which is directly confronted to eyes of the user, said square free spaces constituting openings of a square frustopyramidal shape, a larger base of the frustopyramidal opening is at the outer face and the smaller base of the frustopyramidal is at the inner face of the grid, an area of said larger base of the openings being in a ratio from about 36:1 to 2.25:1 with respect to an area of the smaller base, the total area of the smaller base of each one of said square openings being of from about 0.04 to about 4 mm$^2$, and the width of said bars being of about 1 mm; a transparent sheet attached to the grid on the side thereof which contains the bases of said bars; and a second transparent sheet attached to said grid on the side thereof containing the apexes of said bars, so as to isolate said grid from an environment.

2. A water-proof optical grid according to claim 1 wherein the transparent sheets are bonded to each side of said grid by adhesive means.

3. A water-proof optical grid according to claim 1 wherein the transparent sheets are attached to and pressed against each one of the faces of said grid by means of a peripheral mounting which closes the edges of said grid sandwiched between said transparent sheets in a water-proof manner.

4. A water-proof optical grid according to claim 1 wherein said grid is flat.

5. A water-proof optical grid according to claim 1 wherein said grid is concave.

6. A water-proof optical grid according to claim 3 wherein said grid is used in combination with the rings of a water-proof ophthalmic frame in order to form water-proof goggles.

* * * * *